United States Patent [19]
Shiotani et al.

[11] Patent Number: 4,814,988
[45] Date of Patent: Mar. 21, 1989

[54] MACHINE TRANSLATION SYSTEM TRANSLATING ALL OR A SELECTED PORTION OF AN INPUT SENTENCE

[75] Inventors: Shinobu Shiotani; Yoji Fukumochi; Shinji Tokunaga; Syuzo Kugimiya; Ichiko Sata; Hitoshi Suzuki, all of Nara, Japan

[73] Assignee: Sharp Kabushiki Kaisha, Osaka, Japan

[21] Appl. No.: 51,654

[22] Filed: May 20, 1987

[30] Foreign Application Priority Data

May 20, 1986 [JP] Japan .................. 61-117902

[51] Int. Cl.⁴ .............................................. C06F 15/38
[52] U.S. Cl. ...................................... 364/419; 364/200
[58] Field of Search ............... 364/200, 900, 419; 400/110; 433/156–157

[56] References Cited

U.S. PATENT DOCUMENTS 4,468,754 8/1984 Asada .................. 364/900

FOREIGN PATENT DOCUMENTS 0060345 4/1983 Japan .................. 364/419

OTHER PUBLICATIONS

IBM Technical Disclosure Bulletin, vol. 26, No. 3A, Aug. 1983, pp. 1147–1148.

Primary Examiner—Joseph Ruggiero
Assistant Examiner—Gail O. Hayes
Attorney, Agent, or Firm—Birch, Stewart, Kolasch, & Birch

[57] ABSTRACT

A machine translation system to display an input sentence and a translated sentence thereof, comprising a region specifying circuit for specifying a desired portion in the input sentence, and a partial translating circuit for translating only the portion specified by the region specifying circuit is disclosed.

9 Claims, 3 Drawing Sheets

| ORIGINAL | TRANSLATION |
|---|---|
| ◇ A replica of the Liberty Bell, which is the symbol of American independence, is to be displayed all over the world. | |

FIG. 3(a)

| ORIGINAL | TRANSLATION |
|---|---|
| ◇ I want to advise you that, if I can, you should not go there | |

FIG. 3(b)

| ORIGINAL | TRANSLATION |
|---|---|
| ◇ [[ A replica of the Liberty Bell, which is the symbol of American independence ]]₂ is to be displayed all over the world. | アメリカ合衆国の独立の象徴である Liberty Bell の複製の写し |

FIG. 4(a)

| ORIGINAL | TRANSLATION |
|---|---|
| ◇ I want to advise you that ((, if I can, )) you should not go there | 私はあなたに あなたが そこに行くべきではないと 忠告せねい。 |

FIG. 4(b)

MACHINE TRANSLATION SYSTEM TRANSLATING ALL OR A SELECTED PORTION OF AN INPUT SENTENCE

BACKGROUND OF THE INVENTION

This invention relates to a machine translation system capable of promoting translation works in an interactive method between the operator and the system, by displaying an input sentence (original) and the result of translation of this input sentence, that is, the translated sentence on the CRT screen. In particular, the present invention permits a translating region of the input sentence to be arbitrarily specified.

Machine translation systems proposed so far use the method of translating the entire input sentence (original), and did not possess any function to translate only a desired portion of the input sentence. Accordingly, the conventional system involved the following shortcomings.

(1) A long input sentence (original) takes a long time in translation, and the result is not known unless waiting a long time continuously till the end of translation.

(2) If part of an input sentence (original) is wrong, or is a phrase which is hard for the machine to translate is inserted in part of the input sentence, the translation result of the entire input sentence cannot be obtained.

(3) When desiring to translate only part of an input sentence (original), that portion must be entered again as an independent input sentence.

SUMMARY OF THE INVENTION

This invention is achieved in the light of the conventional problems above, and it is intended to present a very easy-to-use machine translation system, allowing the translation region of an input sentence to arbitrarily be specified so as to enhance the controllability of the operator and enable adjustments in the translation time.

Briefly described, in accordance with the present invention, is a mchine translation system capable of displaying the input sentence and the translated sentence thereof, comprising a region specifying means for specifying a desired portion of said input sentence, and a partial translation means for translating only the portion specified by said region specifying means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 3(a) and (b) show display examples of input sentences; and FIGS. 4(a) and (b) show display examples of input sentences and their translated sentences.

DESCRIPTION OF THE PREFERRED EMBODIMENT

Figure 1:
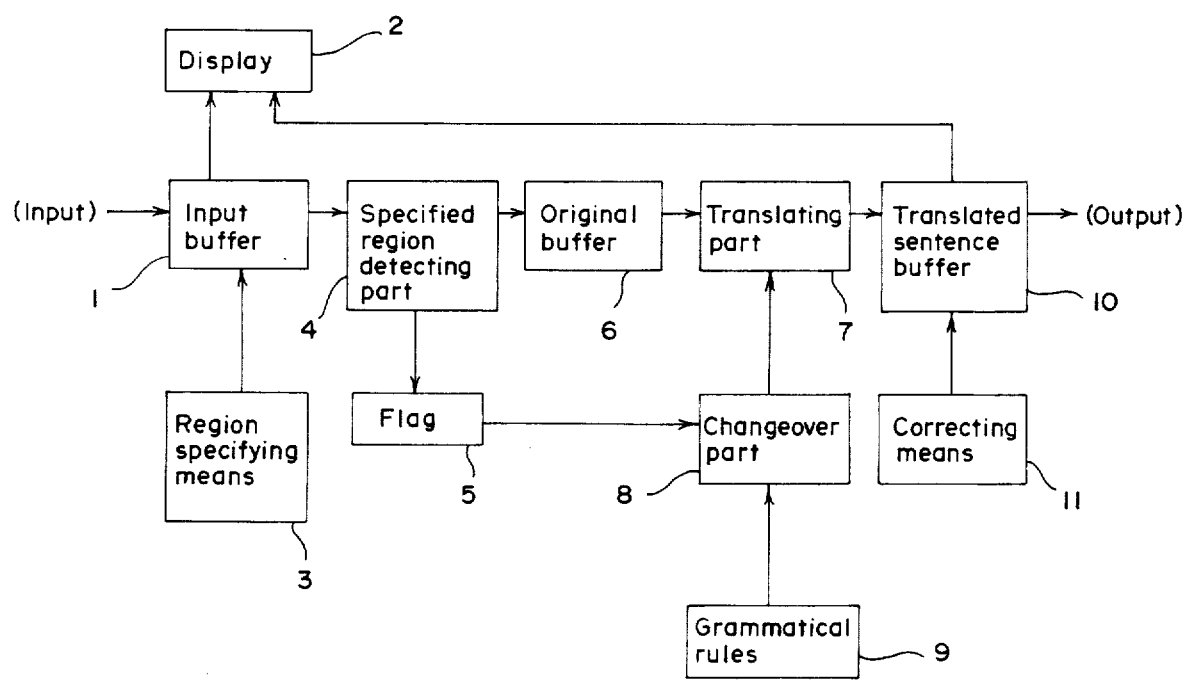
FIG. 1 is a block diagram of essential parts of a machine translation system according to this invention.

Referring now to the drawings, the present invention will now be described in more detail.

FIG. 1 is a block diagram of essential parts of a machine translation system according to this invention.

In the diagram, numeral 1 denotes an input buffer for storing the input sentence (original) fed by an input means such as keys or an optical character reader (OCR). A CRT display unit 2 is provided to display the contents of said input buffer 1 and of a translated sentence buffer which is mentioned later, and a region specifying means 3 is also provided for specifying a translation region in the input sentence once fed into said input buffer 1 and displayed on the CRT screen. In this embodiment, as stated below, keys [[, ]], ((, )) are used as region specifying means.

Numeral 4 represents a specified region detecting part by searching the input sentence in said input buffer and detecting whether or not a specified region by said region specifying means 3 is present in the input sentence. A flag 5 is turned on if a specified region is present as a result of detection. An original buffer 6 introduces only the specified region, if any, in the input sentence (original), and introduces the entire input sentence if a specified region is not present. A translating part 7 for translating the content in said original buffer 6, is composed, for example, of a dictionary look-up/morpheme analyzing part, a syntax analyzing part, a transforming part, and a generating part. Numeral 8 is a changeover part to change over the grammatical rules on a grammatical rule table 9 applied to the translating operation of said translating part 7 depending on the state of flag 5. A translation buffer 10 for storing the result of translation, and a correcting means 11 used by the operator to correct the translation result displayed on the CRT are provided.

Figure 2:
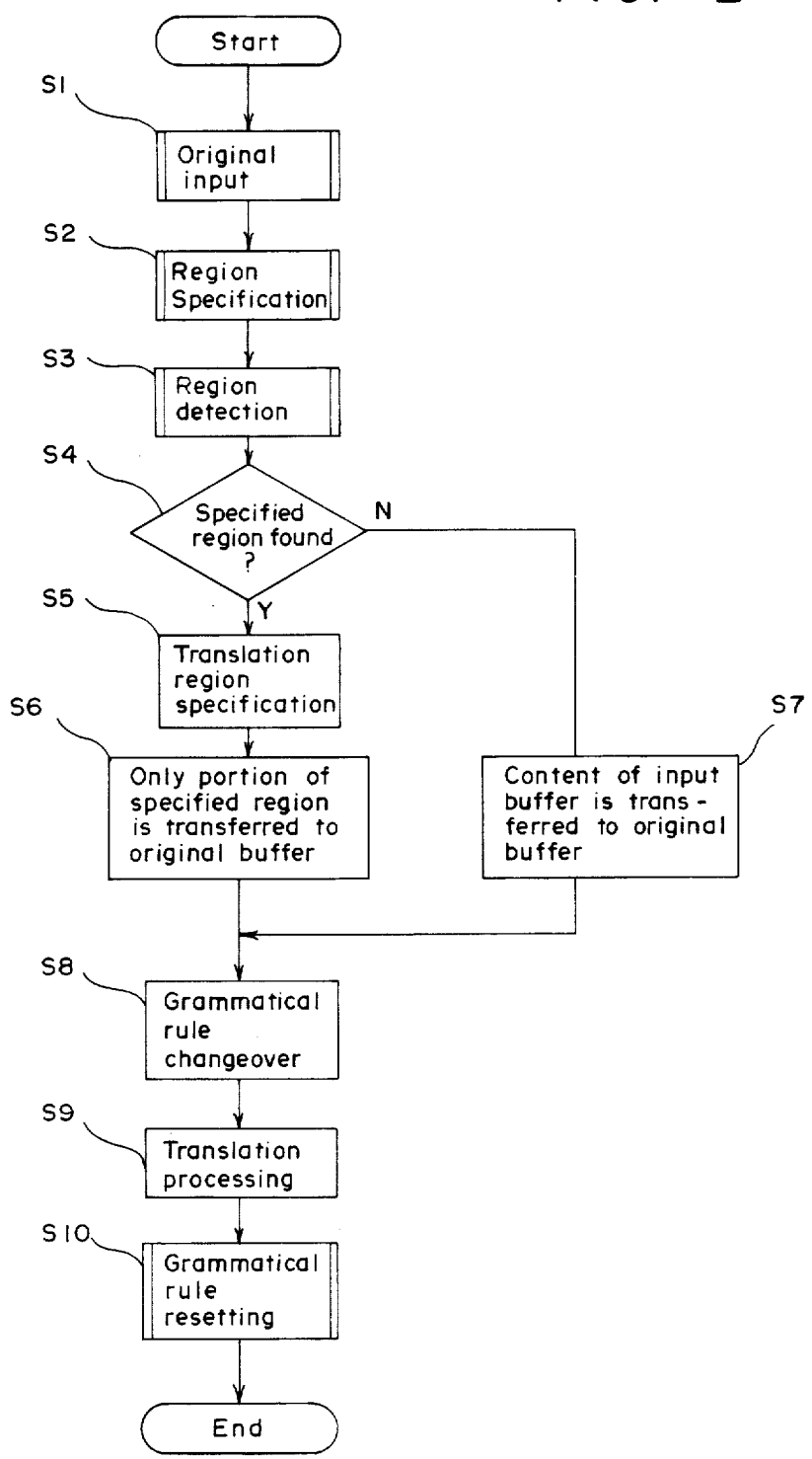
FIG. 2 is an operation flow chart.

FIG. 2 is a processing flow chart, referring to which the operation is described below.

When an input sentence (original) is fed by a key input means (s1), it is stored in an input buffer 1 and is displayed on the CRT display unit at the same time (see FIGS. 3(a), (b)). Then, while observing the display information, when a desired portion of the input sentence is specified by using [[, ]] keys as [[ . . . ]] as shown in FIG. 4(a) and a conversion key is pressed (s2), the content in the input buffer 1 is searched sentence by sentence by a specified region detecting part 4, to detect whether or not a specified region is present in the sentence (s3). When a specified region is found (s4), the marks used in the specification of the region are detected, and if the marks are [[ ]], only the portion within the marks is transferred to the original buffer 6. On the other hand, if the marks are (( )), only the portion other than the content enclosed by the marks is transferred to said original buffer 6 (s5, s6). Of course, if a specified region is not found, the whole input sentence is transferred to the original buffer 6 (s4 to s7 to s8). At the same time, if a specified region is present, said flag 5 is turned on, and the grammatical rules in the table 9 applied in translation are changed over by the changeover part (s8), and the content in the original buffer 6 is translated in said translating part 7 while referring to the grammatical rule (s9). After finishing translation processing of one sentence, the flg 5 is reset (s10), and the translation is over. The result of translation is delivered to a translated sentence buffer 10, and is displayed on the CRT display unit 2 at the same time.

Incidentally, FIG. 4(a) is an example of translating only the portion enclosed by [[ ]] mark, and displaying the translated sentence and input sentence (an English text) on the CRT screen at the same time, while FIG. 4(b) is an example of translating only the portion other than the part enclosed by (( )) marks, and displaying the translated text together with the input sentence.

Thus, by specifying a necessary portion in an input sentence (original) by using marks, only the specified region may be translated. As a result, it is very advantageous for adjusting the time required for translation or for the operation of translation, in translation processing of a very long input sentence (original).

As described herein, by using the machine translation system of this invention, a necessary portion can only be translated by specifying the portion in the input sentence (original), and the following effects may be enjoyed.

(a) It is possible to translate by excluding a portion in a long sentence (input sentence), the translation time can be adjusted by properly specifying the region to be omitted.

(b) By excluding a partial error in the sentence or a hard-to-translate phrase, the sentence which could not be translated by conventional machines can be translated.

While only certain embodiments of the present invention have been described, it will be apparent to those skilled in the art that various changes and modifications may be made therein without departing from the spirit and scope of the present invention as claimed.

What is claimed is:

1. A machine translation system comprising:
region specifying means for specifying a desired translation portion of an input sentence, said region specifying means marking said desired portion with one of two types of markers, two of a same type of markers being used to either enclose or segment the input sentence by surrounding the desired translation portion; and
translation means for translating the desired portion of the input sentence, said translation means using the markers to determine said desired portion, a first type of said two types of markers causing the translation means to translate all parts of the input sentence enclosed thereby while a second type of said two types of markers causes the translation means to translate all but the enclosed portions of the input sentence, a portion of or all of the input sentence being the desired portion depending upon the type of markers used such that the desired portion occurs at one of the following positions;
a beginning portion of the input sentence,
an end portion of the input sentence,
a midportion of the input sentence which excludes the beginning and end portion of the input sentence,
the beginning and end portion of the input sentence separated by a nontranslated midportion of the input sentence, or
the entire input system.

2. The machine translation system as recited in claim 1, further comprising means for simultaneously displaying the input sentence and the translated desired portion.

3. The machine translation system as recited in claim 1, further comprising means for displaying the input sentence.

4. The machine translation system as recited in claim 1, further comprising input means for inputting the input sentence and for permitting man-machine communication.

5. A machine translation system comprising:
buffer means for storing an input sentence;
display means for displaying the input sentence;
region specifying means for specifying a translation portion in said input sentence, said region specifying means marking said translation portion with one of two types of markers, two of a same type of markers being used to either enclose or segment the input sentence by surrounding the translation portion;
specified region detecting means for detecting whether a specified region by said region specified means is present in the input sentence;
flag means for indicating when the specified region is present;
original buffer means for storing the specified region when the specified region is present in the input sentence and for storing the entire input sentence if a specified region is lacking, said original buffer means using the markers from said region specifying means to determine the translation portion, a first type of said two types of markers causing the original buffer means to store all parts of the input sentence enclosed thereby while a second type of said two types of markers causes the original buffer means to store all but the enclosed portion of the input sentence, a portion of or all of the input sentence being the translation portion depending upon the type of markers used such that the translation portion occurs at one of the following positions;
a beginning portion of the input sentence,
an end portion of the input sentence,
a midportion of the input sentence which excludes the beginning and end portion of the input sentence,
the beginning and end portion of the input sentence separated by a nontranslated midportion of the input sentence, or
the entire input sentence;
translation means for translating the contents of the input sentence stored in said original buffer means;
changeover means for changing grammatical rules of a grammatical rule table used for translation from a first language to a second language of the translating means;
translation buffer means for storing a result of translation by said translation means; and
correction means for correcting the result of the translation by said translation means.

6. The machine translation system as recited in claim 5, wherein said translation means comprises:
dictionary look-up means for checking the spelling of words;
morpheme means for analyzing a morpheme of the words;
syntax means for analyzing syntax of the words;
transforming means for transforming the words of the first language into the second language with reference to grammar of the first and second languages by using the dictionary look-up means, morpheme means and syntax means; and generating means for generating target words of the second language.

7. The machine translation system of claim 5, wherein said region specifying means comprises keyboard means operated by an operator.

8. The machine tranalation system of claim 7, wherein said keyboard means comprises key switch means operated to input the first and second types of markers.

9. The machine translation system of claim 5, further comprising optical reader means for inputting the input sentence into said buffer means.

* * * * *